(12) United States Patent
Kwak et al.

(10) Patent No.: US 11,541,769 B2
(45) Date of Patent: Jan. 3, 2023

(54) ROBOT SYSTEM AND CONTROL METHOD OF THE SAME

(71) Applicant: LG ELECTRONICS INC., Seoul (KR)

(72) Inventors: Hoseong Kwak, Seoul (KR); Seukwoo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 627 days.

(21) Appl. No.: 16/589,792

(22) Filed: Oct. 1, 2019

(65) Prior Publication Data

US 2020/0031248 A1 Jan. 30, 2020

(30) Foreign Application Priority Data

Aug. 8, 2019 (KR) .................. 10-2019-0096773

(51) Int. Cl.
*B60L 53/37* (2019.01)
*B60L 53/66* (2019.01)
*G05D 1/02* (2020.01)
*B60L 53/16* (2019.01)
*G05D 1/00* (2006.01)
*H02J 7/00* (2006.01)
*B60L 53/65* (2019.01)

(52) U.S. Cl.
CPC .............. *B60L 53/37* (2019.02); *B60L 53/16* (2019.02); *B60L 53/65* (2019.02); *B60L 53/66* (2019.02); *G05D 1/0094* (2013.01); *G05D 1/0231* (2013.01); *G05D 1/0255* (2013.01); *H02J 7/0045* (2013.01); *B60Y 2200/91* (2013.01); *B60Y 2300/91* (2013.01)

(58) Field of Classification Search
CPC ....................................................... B60L 53/37
USPC ........................................................... 701/23
See application file for complete search history.

(56) References Cited

U.S. PATENT DOCUMENTS

| 4,870,592 A * | 9/1989 | Lampi ................ G05B 19/4189 29/563 |
| 9,592,742 B1 * | 3/2017 | Sosinov .................. B60L 53/14 |
| 2011/0077809 A1 * | 3/2011 | Leary ...................... B60L 53/14 320/109 |
| 2013/0011234 A1 * | 1/2013 | Pretlove ................... B25J 5/005 701/2 |
| 2014/0354229 A1 * | 12/2014 | Zhao ....................... B60L 53/37 320/109 |
| 2018/0345811 A1 * | 12/2018 | Michels .................... B60S 3/04 |
| 2018/0361870 A1 * | 12/2018 | Zhao ....................... B60L 58/12 |
| 2019/0061542 A1 * | 2/2019 | Zhao ...................... H02J 7/0042 |
| 2020/0144838 A1 * | 5/2020 | Penilla .................... B60L 53/14 |
| 2020/0346553 A1 * | 11/2020 | Grimm ................... B60L 53/66 |

FOREIGN PATENT DOCUMENTS

KR 10-1410272 B1 6/2014

* cited by examiner

*Primary Examiner* — Jerry D Robbins
(74) *Attorney, Agent, or Firm* — Birch, Stewart, Kolasch & Birch, LLP

(57) ABSTRACT

Provided is a robot system. The robot system includes a guide rail, a slider configured to move along the guide rail, a first source disposed the slider to move together with the slider, a rotation arm configured to rotate by the first driving source, and a vehicle service robot installed the rotation arm to move by the rotation arm.

7 Claims, 10 Drawing Sheets

ROBOT SYSTEM AND CONTROL METHOD OF THE SAME

CROSS-REFERENCE TO RELATED APPLICATIONS

This application claims the benefit of priority to Korean Patent Application No. 10-2019-0096773, filed in the Korean Intellectual Property Office on Aug. 8, 2018 under 35 U.S.C. 119 and/or 35 U.S.C. 120, the entire contents of which are incorporated herein by reference.

BACKGROUND

The present invention relates to a robot system and a control method of the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

An example of a robot may be used to provide a fueling service or a charging service to a vehicle, and this example is disclosed in Korean Patent Publication No. 10-1410272 (Jun. 23, 2014). Korean Patent Publication No. 10-1410272 (Jun. 23, 2014) discloses an electric vehicle charging robot charging a battery of a parked electric vehicle that is unmannedly driven within a packing area and an electric vehicle charging system including the electric vehicle charging robot.

The electric vehicle charging robot is docked in a charging station to complete charging to a power source unit and then moves to the vehicle to charge the power to the battery of the vehicle. A control unit of the electric vehicle charging robot has built-in program in which an unmanned driving path of the electric vehicle charging robot is set. When the driving of the electric vehicle charging robot along the unmanned driving path is completed, or the power of the power supply unit is less than a predetermined ratio, the program ends vehicle management driving of the electric vehicle charging robot and instructs movement to the charging station.

SUMMARY

Since the electric vehicle charging robot and the electric vehicle charging system according to the related art are provided with a driving unit for driving unmannedly in the electric vehicle charging robot, the structure of the electric vehicle charging robot may be complicated, and in the event of malfunction of the unmanned electric vehicle charging robot or vehicle, possibility of damage of the vehicle within the parking area or the electric vehicle charging robot may be high.

Also, since the electric vehicle charging robot moves to the charging station and then charged by the charging stand, the electric vehicle located in a parking line may not be charged to allow the electric vehicle charging robot to be standby while the electric vehicle charging robot is being charged.

Embodiments provide a robot system and a method for controlling the same, in which the vehicle service robot has a simple structure, and a distance that the vehicle service robot reaches around the vehicle is maximized so that a vehicle service robot provides vehicle-related services at various locations around the vehicle and continuously provides a service to a plurality of vehicles.

Embodiments also provide a robot system and a method for controlling the same, in which a vehicle service robot moves by a simple structure using an arm to simplify a structure and reduce manufacturing costs.

In one embodiment, a robot system includes: a guide rail; a slider configured to move along the guide rail; a first driving source disposed on the slider to move together with the slider; a rotation arm configured to rotate by the first driving source; and a vehicle service robot installed on the rotation arm to move by the rotation arm.

The first driving source may be controlled in a plurality of modes, and the plurality of modes may include a first mode and a second mode.

In the first mode, the rotation arm may rotate in a first direction in which the rotation arm is long in a longitudinal direction of the guide rail.

In the second mode, the rotation arm may rotate in a second direction in which the rotation arm crosses the longitudinal direction of the guide rail.

The guide rail may be disposed around a plurality of parking areas.

The rotation arm may have a length less than the shortest straight distance between a wheel stopper installed in each of the parking areas and the guide rail.

The robot system may further include an indicator configured to indicate a chargeable area of the plurality of parking areas.

The robot system may further include a safety guard disposed between each of the parking areas and the guide rail. An upper end of the safety guide may have a height less than that of the rotation arm.

The robot system may further include: a sensor configured to sense a vehicle; a server configured to transmit charging port position information of the vehicle according to information of the vehicle, which is sensed by the sensor; and a controller configured to control the vehicle service robot and the first driving source.

The controller may control the first driving source so that the vehicle service robot moves around a position of a charging port of the vehicle, which is sensed by the sensor.

The vehicle service robot may be controlled in a plurality of modes, and the plurality of modes may include a connection mode and a release mode.

In the connection mode, the vehicle service robot may connect a plug of a charger to a charging port of a vehicle.

In the release mode, the vehicle service robot may separate the plug from the charging port.

When the vehicle is in a chargeable state, the controller may control the first driving source so that the vehicle service robot moves around the charging port of the vehicle and controls the vehicle service robot to the connection mode.

In another embodiment, a robot system includes: a transfer robot having a driving wheel; a driving source mounted on the transfer robot; a rotation arm configured to rotate by the driving source; and a vehicle service robot installed on the rotation arm to move by the rotation arm.

The robot system may further include: a sensor control system; a vision system configured to sense a license plate of the vehicle when the vehicle enters, the vision system being configured to sense a risk factor when the vehicle is charged; a charging station system configured to control a charger that charges the vehicle; a robot control system configured to control the first driving source, a second driving source that allows the slider to straightly move, and the vehicle service robot; and a robot vision system installed in the vehicle service robot to sense a charging port of the vehicle.

The robot system may further include a control system configured to control the sensor control system, a global vision system, the charging station system, the robot control system, and the robot vision system.

Each of sensor control system, a global vision system, the charging station system, the robot control system, and the robot vision system may communicate with other systems.

The robot system may further include: a robot management system including: a robot control system configured to control the first driving source, a second driving source that allows the slider to straightly move, and the vehicle service robot; and a robot vision system installed in the vehicle service robot to sense a charging port of the vehicle; a charging station system configured to control a charger that charges the vehicle; and an integrated control system configured to communicate with the robot management system and the charging station system.

The integrated station system may include: a sensor control system; a global vision system configured to sense a license plate of the vehicle when the vehicle enters, the global system being configured to sense a risk factor when the vehicle is charged; and a control system.

In further another embodiment, a method for controlling a robot system, which includes: a driving source; a rotation arm rotating by the driving source; and a vehicle service robot installed on the rotation arm, the method including: entry processing of a vehicle when the vehicle enters; preparing charging of the vehicle; allowing the vehicle service robot to connect a plug to a charging port of the vehicle after the rotation arm rotates by the driving source; and charging the vehicle.

In the allowing the vehicle service robot to connect the plug to the charging port of the vehicle, the vehicle service robot may connect the plug to the charging port of the vehicle after the rotation arm rotates by the driving source so that the vehicle service robot moves to a position adjacent to the charging port of the vehicle in a state of holding a plug of a charger.

The entry processing of the vehicle may include: allowing a vision sensor to sense a license plate of the vehicle; confirming a position of the charging port of the vehicle according to the license plate; determining a charging service robot for servicing the vehicle of which the license plate is sensed among a plurality of charging service robots; and guiding the vehicle to a parking area corresponding to the determined charging service robot.

The preparing charging of the vehicle may include: allowing a customer to pay a service cost; and allowing the vehicle to be standby for charging after a payment of the service cost.

The allowing the vehicle to be standby may include: allowing the vision sensor to re-sense the license plate of the vehicle; and confirming whether the license plate recognized in the entry processing of the vehicle is the same.

The allowing the vehicle to be standby may include: allowing at least one of the vision sensor or an ultrasonic sensor to sense whether the vehicle gets out of a parking area, allowing the vision sensor to sense start-off of the vehicle, door opening of the vehicle, and getting off of the customer; allowing the vision sensor to sense whether a nearby object to approaches the vehicle, the vehicle service robot, or the charger; or generating an announcement for limiting riding or getting off of the customer.

The allowing the vehicle service robot to connect a plug to a charging port may include: allowing a vision camera to recognize a position of a port cover; allowing the vision camera to approach surroundings of the recognized position and sense a type of port cover, and allowing the vehicle service robot to open the port cover; and allowing the vehicle service robot to connect the plug to the charging port.

When the plug is connected to the charging port, a position, force, and rigidity of the plug may be controlled.

The method may further include separating the plug from the charging port of the vehicle.

The separating of the plug may include: allowing the vehicle service robot to separate the plug from the charging port when the charger receives a charging completion signal from the robot; and allowing the vehicle service robot to move so that the plug returns to the charger.

The method may further include: preparing exiting of the vehicle; and exit processing of the vehicle.

The preparing of the exiting of the vehicle may include: allowing a vision sensor to sense a closed state of a port cover that covers the charging port; allowing the vision sensor to inform an opened state of the port cover when the port cover is in the opened state; and allowing the vision sensor to sense surroundings or a vehicle state.

The preparing exiting of the vehicle may include: resetting the vehicle service robot; and informing charging completion to a customer.

The details of one or more implementations are set forth in the accompanying drawings and the description below. Other features will be apparent from the description and drawings, and from the claims.

DETAILED DESCRIPTION OF THE EMBODIMENTS

Figure 1:
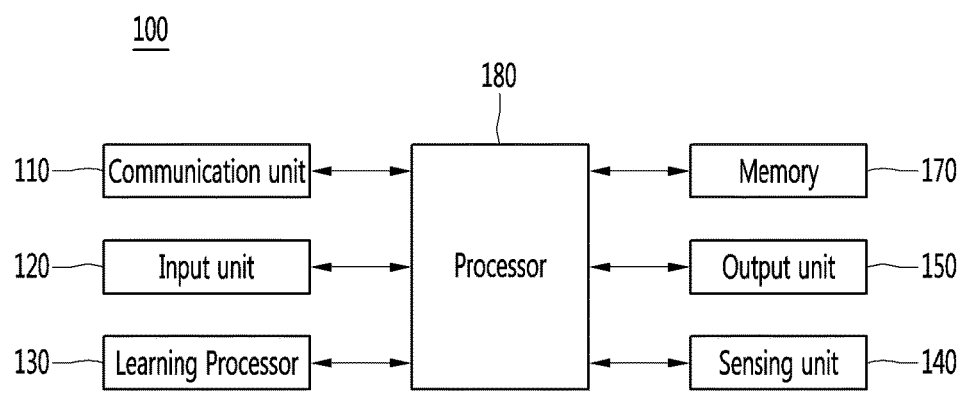
FIG. 1 is a view of an artificial intelligence (AI) device including a robot system according to an embodiment.

Hereinafter, detailed embodiments of the present invention will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
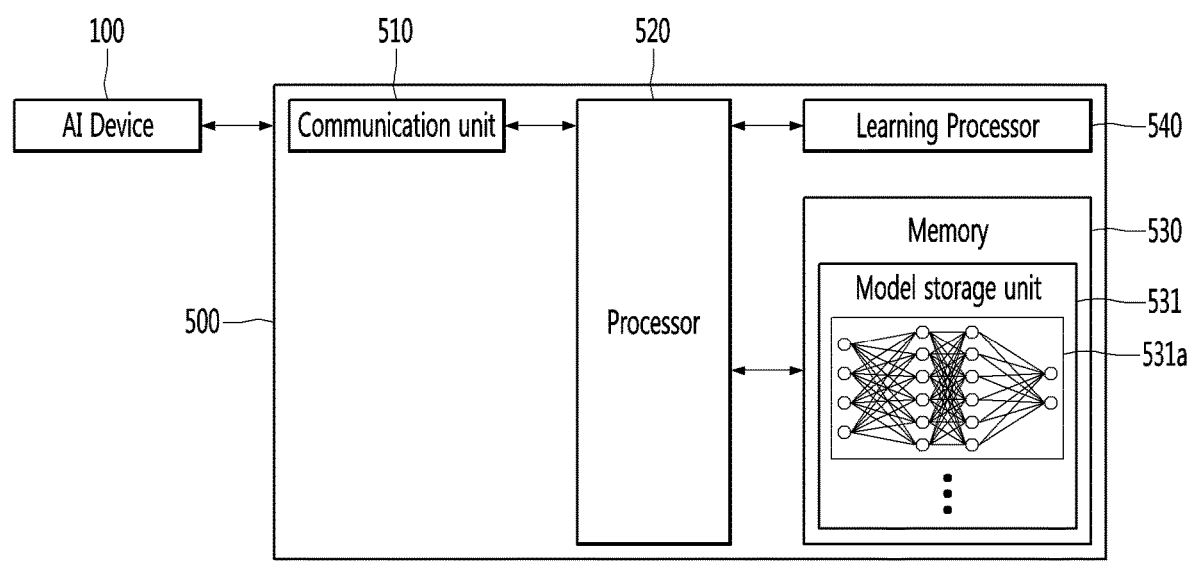
FIG. 2 is a view of an AI server connected to the robot system according to an embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 520, and the like.

The communication unit 510 can transmit and receive data to and from an external device such as the AI device 100.

The memory 530 may include a model storage unit 531. The model storage unit 531 may store a learning or learned model (or an artificial neural network 531*a*) through the learning processor 540.

The learning processor 540 may learn the artificial neural network 531*a* by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
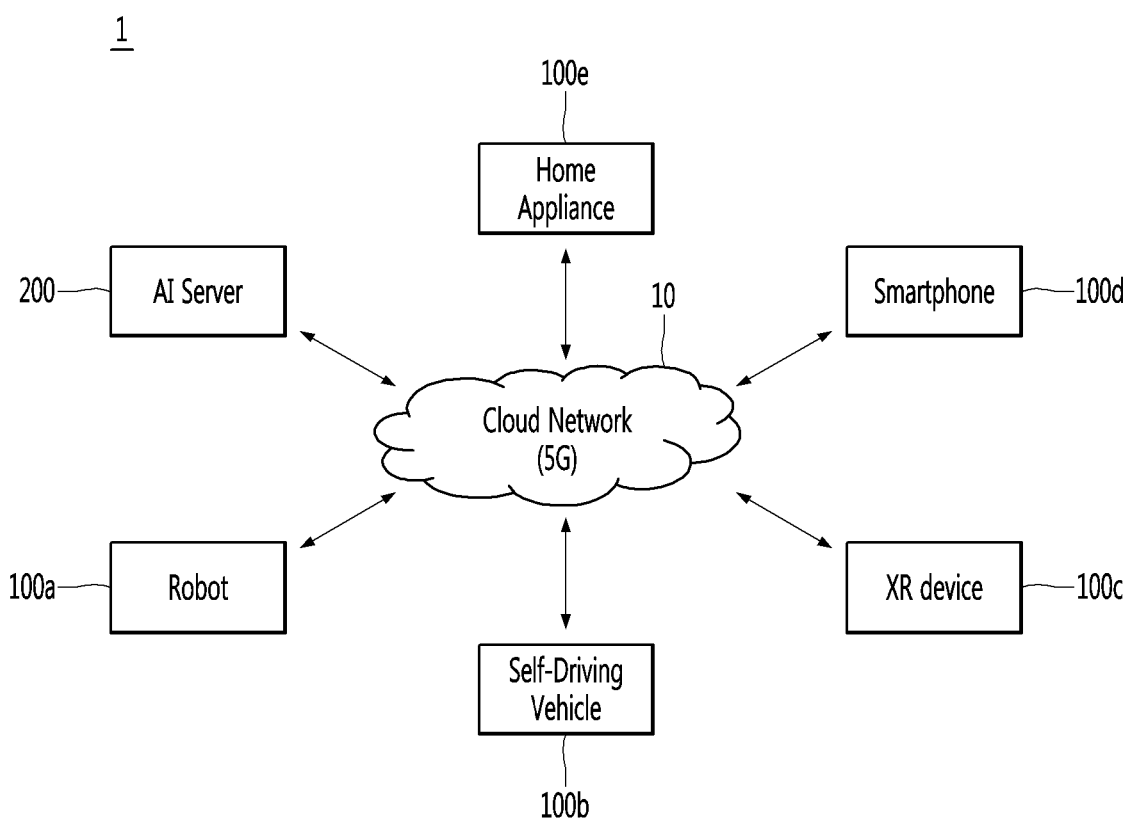
FIG. 3 is a view of an AI system including the robot system according to an embodiment.

FIG. 3 illustrates an AI system 1 according to an embodiment of the present invention.

Referring to FIG. 3, in the AI system 1, at least one of an AI server 500, a robot 100*a*, a self-driving vehicle 100*b*, an XR device 100*c*, a smartphone 100*d*, or a home appliance 100*e* is connected to a cloud network 10. The robot 100*a*, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

Figure 4:
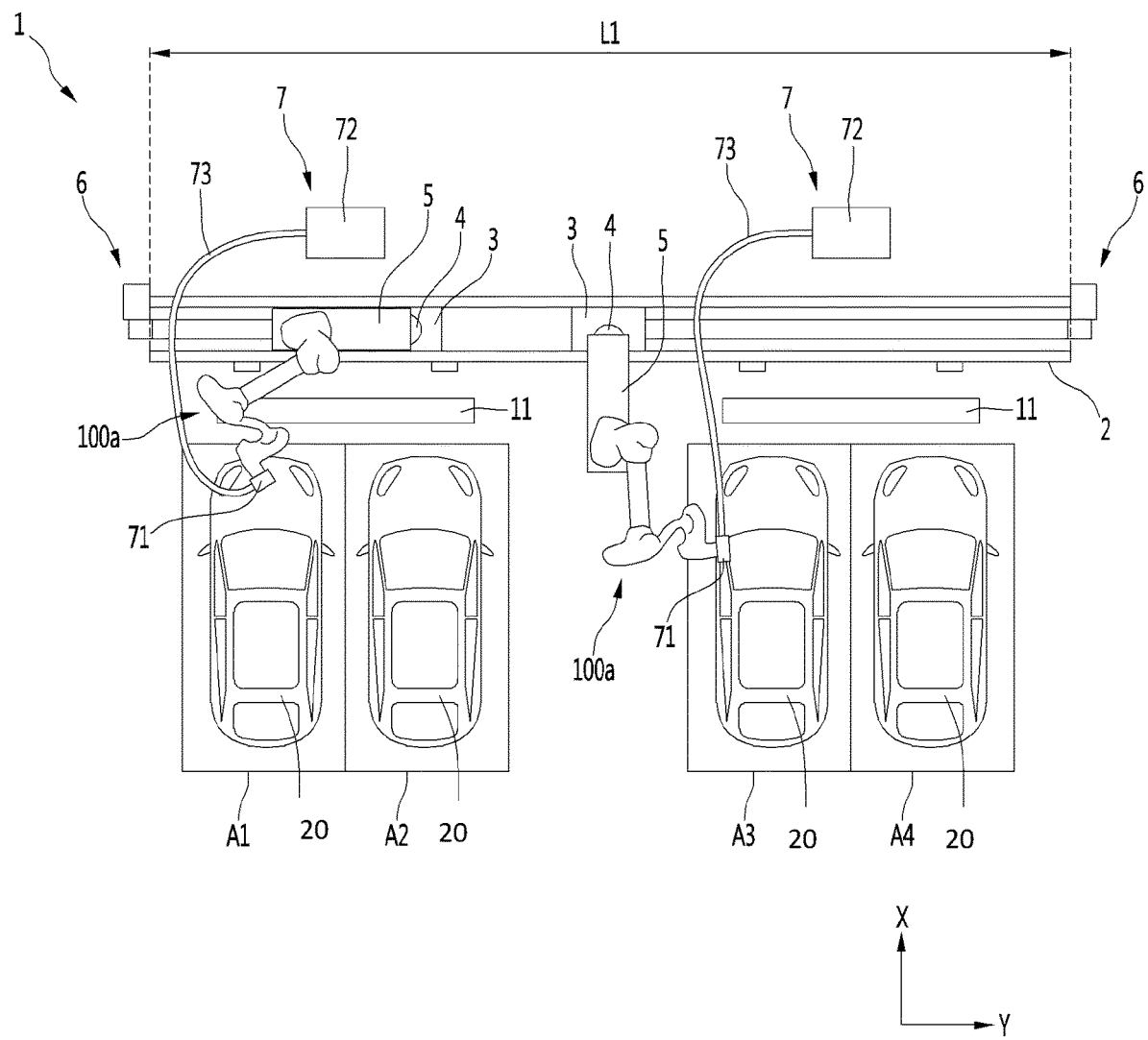
FIG. 4 is a plan view of the robot system according to an embodiment.
Figure 5:
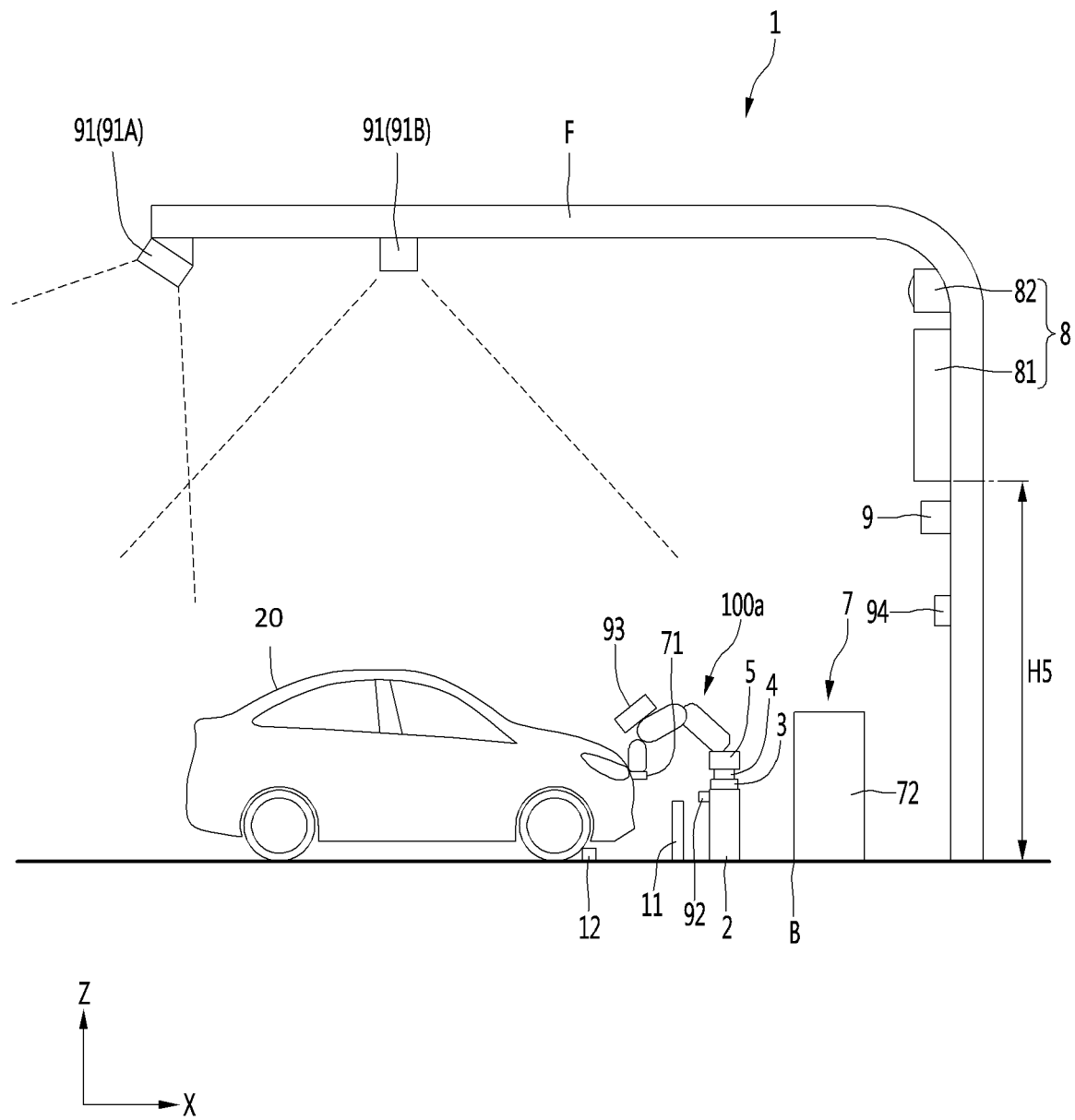
FIG. 5 is a side view of the robot system according to an embodiment.

FIG. 4 is a plan view of the robot system according to an embodiment, and FIG. 5 is a side view of the robot system according to an embodiment.

Figure 6:
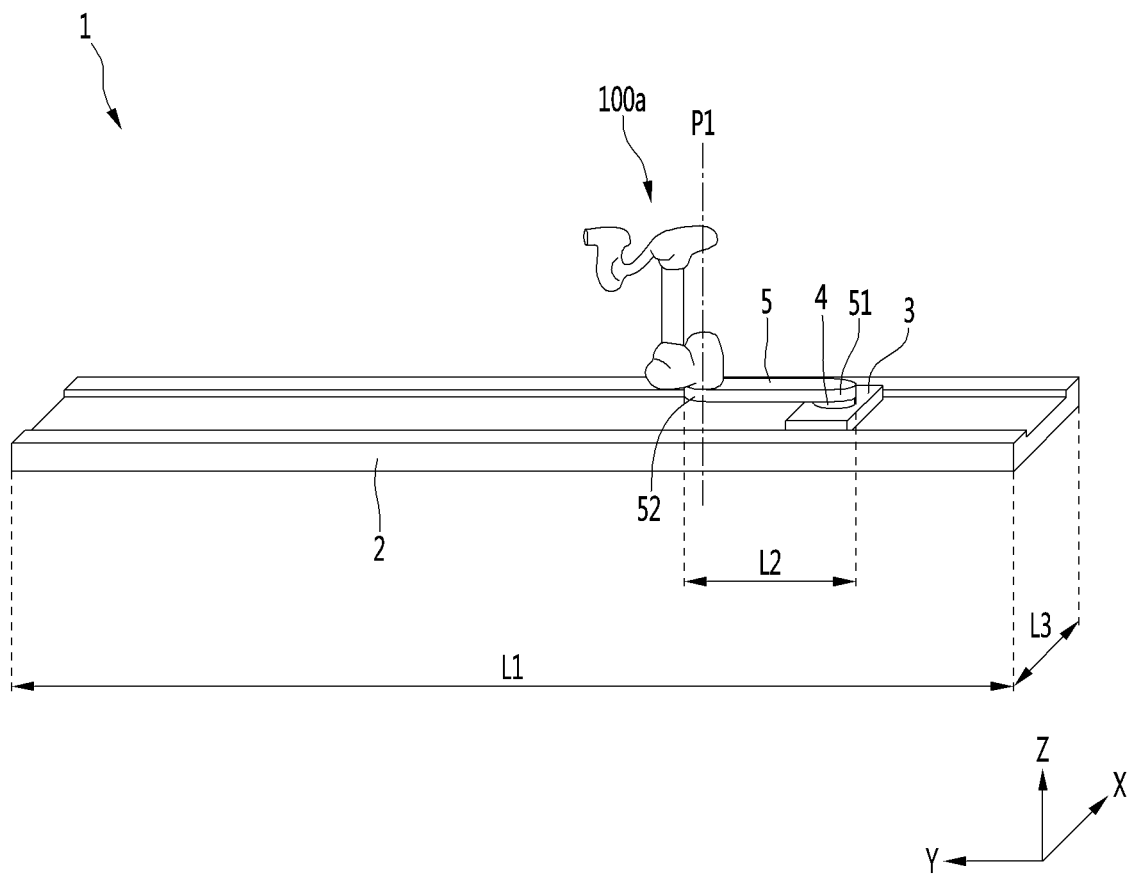
FIG. 6 is a perspective view of a vehicle service robot of FIG. 4 when the vehicle service robot is disposed at a first position.
Figure 7:
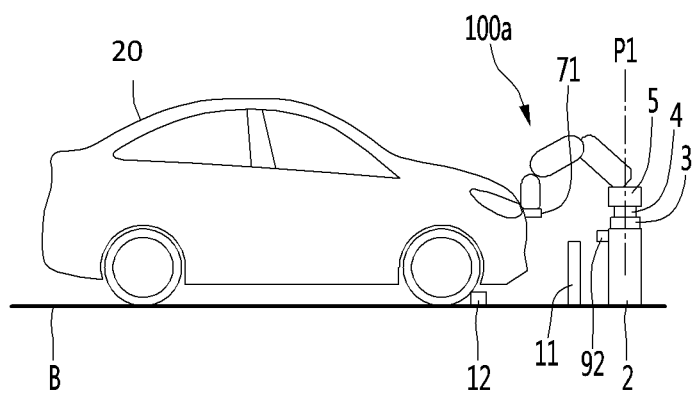
FIG. 7 is a side view of the vehicle service robot of FIG. 6 when the vehicle service robot provide a service to a vehicle at a first position.

FIG. 6 is a perspective view of a vehicle service robot of FIG. 4 when the vehicle service robot is disposed at a first position, and FIG. 7 is a side view of the vehicle service robot of FIG. 6 when the vehicle service robot provide a service to a vehicle at a first position.

Figure 8:
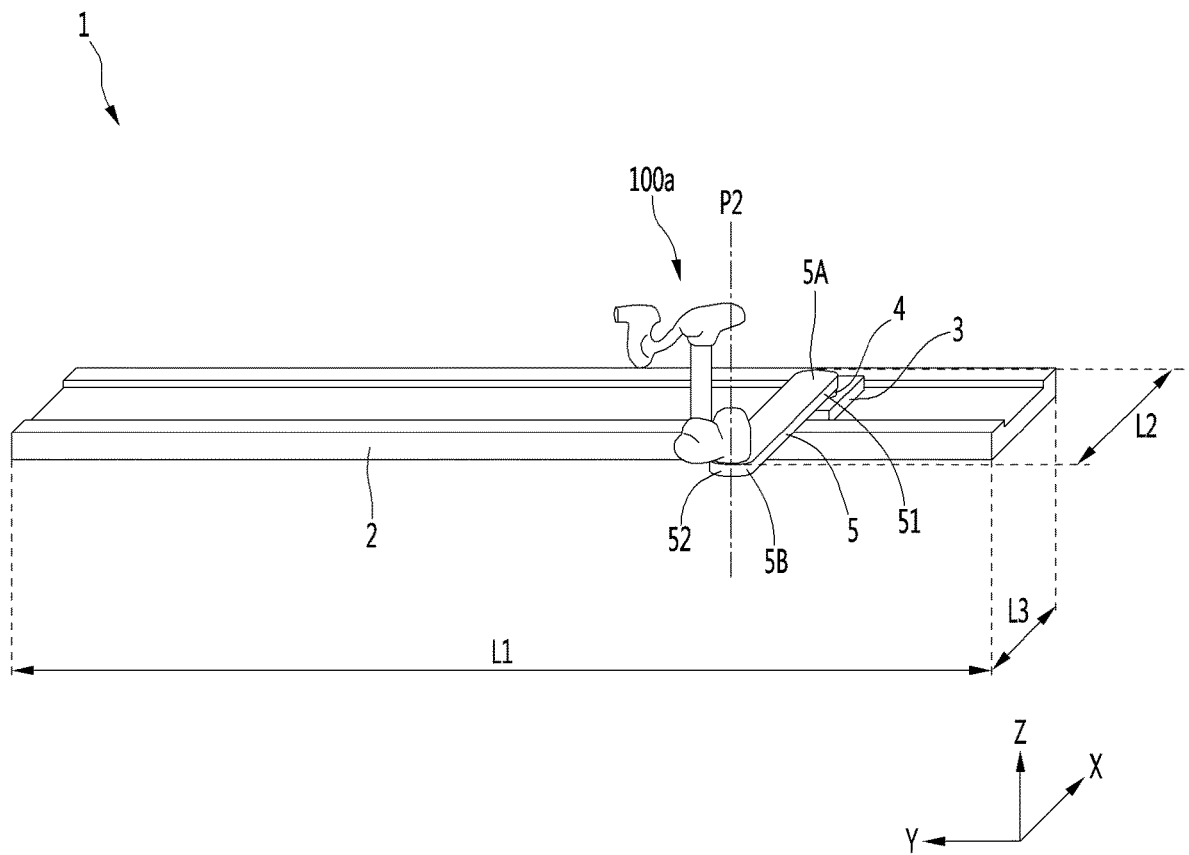
FIG. 8 is a perspective view of the vehicle service robot of FIG. 4 when the vehicle service robot is disposed at a second position.
Figure 9:
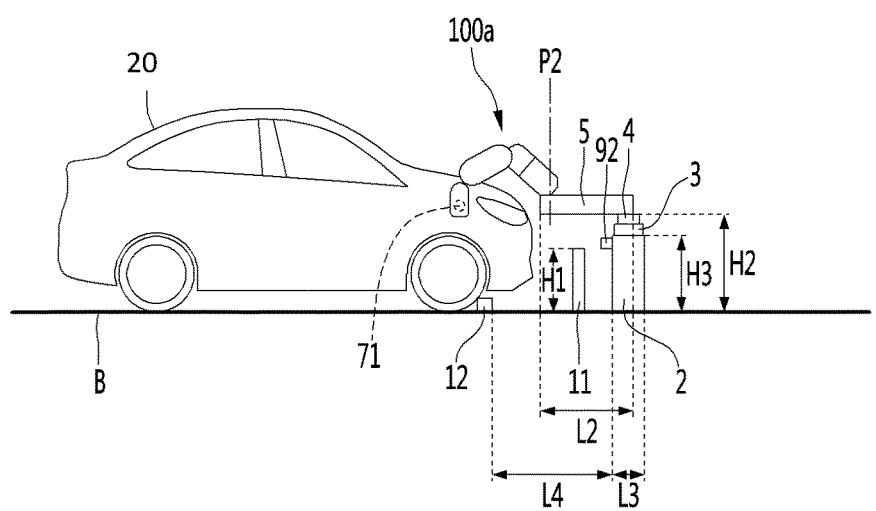
FIG. 9 is a side view of the vehicle service robot of FIG. 8 when the vehicle service robot provides a service to a vehicle at a second position.

FIG. 8 is a perspective view of the vehicle service robot of FIG. 4 when the vehicle service robot is disposed at a second position, and FIG. 9 is a side view of the vehicle service robot of FIG. 8 when the vehicle service robot provides a service to a vehicle at a second position.

Figure 10:
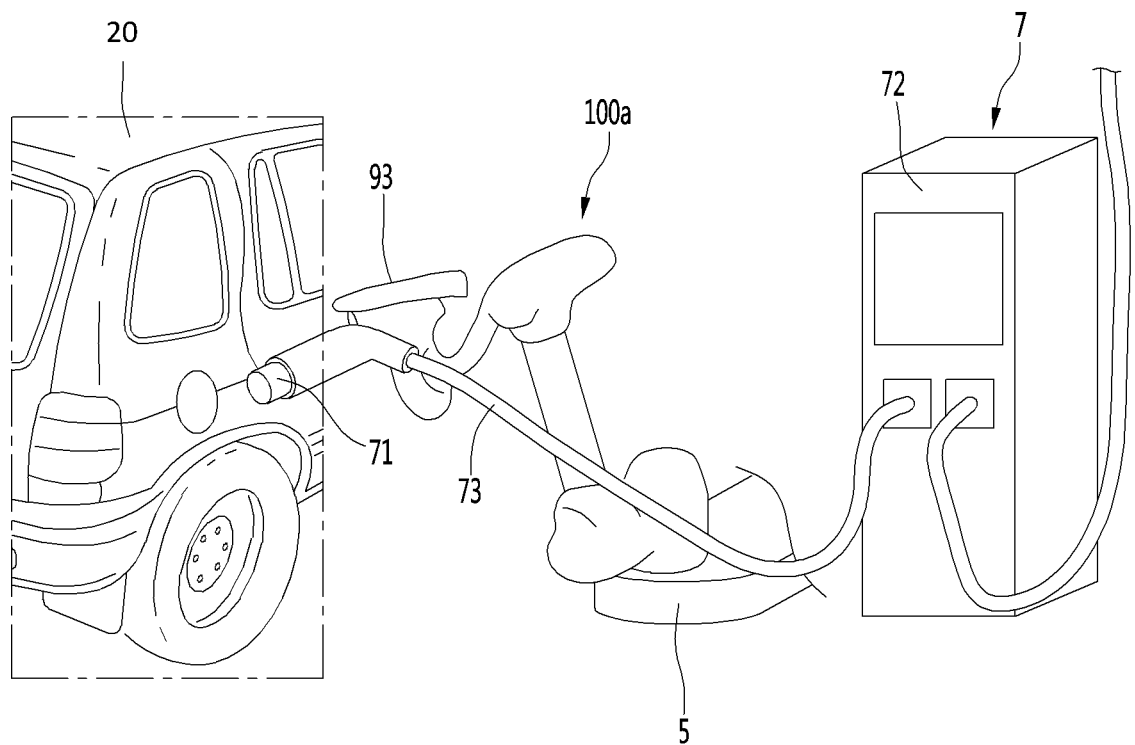
FIG. 10 is a perspective view of the vehicle service robot and a charger according to an embodiment.
Figure 11:
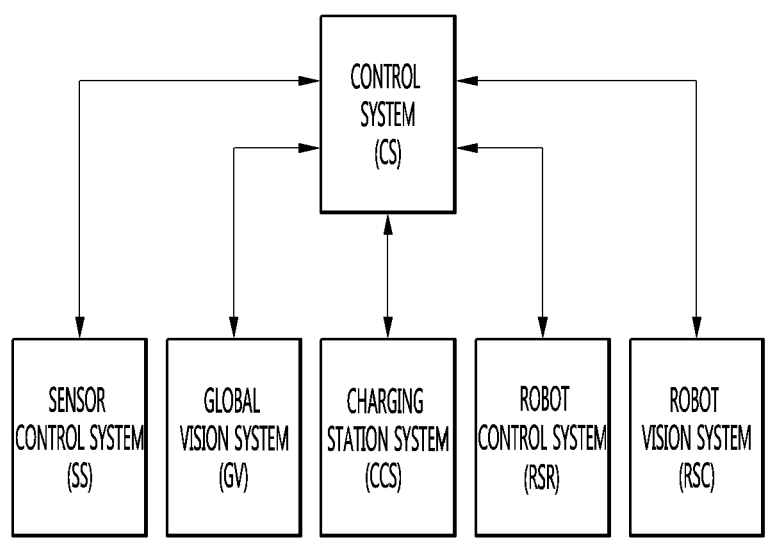
FIG. 11 is a control block diagram illustrating an example of a robot system according to an embodiment.

FIG. 10 is a perspective view of the vehicle service robot and a charger according to an embodiment, and FIG. 11 is a control block diagram illustrating an example of a robot system according to an embodiment.

The robot system illustrated in FIGS. 4 to 10 may include a robot 100*a* capable of providing a service to a vehicle 20. Hereinafter, the robot 100*a* capable of providing the service to the vehicle 20 will be referred to as a vehicle service robot 100*a*.

The vehicle 20 may be an autonomous vehicle 100*b* shown in FIG. 3 and also may be a general vehicle (that is, a non-autonomous vehicle) in which a driver directly operates with a steering wheel.

The vehicle 20 may be an electric vehicle that is driven by an electrically driven motor and also may be a general vehicle (that is, called a non-electric vehicle) in which an engine driven by fossil raw materials such as gasoline, diesel, or LPG is mounted. In addition, the vehicle 20 may be a hydrogen electric vehicle that is driven by producing electricity using a fuel cell system by using hydrogen as an energy source.

The robot 100*a* may be a fueling/charging service robot disposed at a gas station/gas charging station serving the fossil raw materials as a general vehicle, and the robot 100*a* may connect a gas supply gun or a gas charging gun provided at the gas station or gas filling station to a general vehicle to service the fossil raw materials to the general vehicle.

The robot 100*a* may be a charging service robot disposed at the charging station for supplying electricity to the electric vehicle, and the robot 100*a* may connect a plug 71 provided at the charging station to the electric vehicle to service electricity to the electric vehicle.

The robot 100*a* may be a hydrogen service robot that provides a service for supplying hydrogen to the hydrogen electric vehicle.

The robot 100*a* may provide services related to the vehicle such as a car wash service to the vehicle 20. Hereinafter, the robot 100*a* capable of providing various services to the vehicle 20 will be referred to as the vehicle service robot 100*a*.

The robot system illustrated in FIGS. 4 to 10 may move the vehicle service robot 100*a* to an optimal position at which the vehicle service robot 100*a* services the vehicle 20.

The robot system is preferably configured to move the vehicle service robot 100*a* to a plurality of positions such as left, right, front, and back sides of the vehicle 20 to service each of various kinds of vehicles at an optimum position. In this case, the vehicle service robot 100*a* does not need to be provided with a separate wheel for driving the vehicle service robot 100*a*, and thus, a structure of the vehicle service robot 100*a* may be simplified.

The robot system includes a guide rail 2; a slider 3 moving along the guide rail 2; a first driving source 4 disposed on the slider 3 to move together with the slider 3; and a rotation arm 5 rotating by the first driving source 4. The vehicle service robot 100*a* may be installed on the rotation arm 5 to move by the slider 3 and the rotation arm 5.

The slider 3 and the rotation arm 5 may constitute a carrier or scalar robot that horizontally transports the vehicle service robot 100*a* in the same plane (for example, a horizontal plane).

A plurality of parking areas A1, A2, A3, and A4 may be provided in the vehicle service providing facility 1 in which the robot system is installed. An example of the vehicle service providing facility 1 in which the robotic system is installed may be a charging station capable of simultaneously charging a plurality of vehicles. In this embodiment, the vehicle service providing facility 1 is not limited to the charging station, but may also be a gas station or a car wash.

The guide rail 2 may be disposed around the parking area in which the vehicle 20 is parked. The guide rail 2 may be lengthily disposed around the plurality of parking areas A1, A2, A3, and A4.

Each of the parking areas A1, A2, A3, and A4 may have a rectangular shape in which a width a length in a direction in which the vehicle 20 moves to be parked in or exist, i.e., in a front and rear direction X is longer than a width in a left and right direction Y.

The guide rail 2 may be lengthily disposed in the direction Y perpendicular to a longitudinal direction X of the parking areas A1, A2, A3, and A4.

In the robot system, one guide rail 2 may be disposed around the plurality of parking areas A1, A2, A3, and A4. One guide rail 2 may be arranged around at least two parking areas.

The plurality of parking areas A1, A2, A3, and A4 provided in the vehicle service providing facility 1 may be provided to be spaced apart from each other in the left and right direction Y, which is a width direction of the parking area, and the guide rail 2 may be lengthily disposed in the direction Y, in which the plurality of parking areas A1, A2, A3, and A4 are spaced apart from each other, around the parking areas A1, A2, A3, and A4.

The guide rail 2 and the plurality of parking areas A1, A2, A3, and A4 may be configured in a relationship of 1:N, and the vehicle service providing facility 1 may include a plurality of guide rails corresponding to the plurality of parking area A1. A2, A3, and A4.

For example, in the vehicle service providing facility 1, two guide rails may correspond to four parking areas. In this case, one guide rail may correspond to two parking areas. The vehicle service providing facility 1 is not limited to the number of guide rails 2 and the number of parking areas.

For another example, in the vehicle service providing facility 1, one guide rail 2 may correspond to four parking areas. In this case, one guide rail 2 may correspond to four parking areas. The vehicle service providing facility 1 is not limited to the number of guide rails 2 and the number of parking areas.

The guide rail 2 may be disposed on the ground B of the vehicle service providing facility 1, and a loop (not shown) or a frame F disposed at a predetermined height above the ground B of the vehicle service providing facility 1 may be provided. Also, the guide rail may be disposed on a parking elevator that is disposed in the vehicle service providing facility 1 to elevate the vehicle or may be disposed on a parking rotor that is disposed in the vehicle service providing facility 1 to rotate the vehicle.

Hereinafter, convenience of description, although the guide rail 2 is described as being disposed on the ground B of the vehicle service providing facility 1, the installation position of the guide rail 2 is not limited to the ground B of the vehicle service providing facility 1.

Hereinafter, the ground B of the vehicle service providing facility 1 will be described as a ground or mechanism in which the vehicle is capable of being parked in the vehicle service providing facility 1.

The vehicle service providing facility 1 may be provided with a safety guard 11 that prevents the guide rail 2 from being damaged by the vehicle parked in the parking areas A1, A2, A3, and A4.

The safety guard 11 may be erected perpendicular to the ground B (see FIG. 5) of the vehicle service providing facility 1 and may be spaced apart from the guide rail 2 in the entering/exiting direction X of the vehicle.

The safety guard 11 may be disposed between the parking area and the guide rail 2.

As illustrated in FIG. 9, a height H1 of an upper end of the safety guard 11 may be less than a height H2 of the rotation arm 5. The height H1 of the upper end of the safety guard 11 may be less than a height H3 of an upper end of the guide rail 2.

When the rotation arm 5 rotates at a predetermined angle in a direction toward the vehicle 20 on the guide rail 2, a portion of the rotation arm 5 may be disposed on the safety guard 11 as illustrated in FIG. 9. Also, in a state in which the rotation arm 5 does not interfere with the safety guard 11, the vehicle service robot 100a may move to a service providing position P2 around the guide rail 2 instead of on the guide rail 2.

The slider 3 may be a carrier moving along the guide rail 2 in the longitudinal direction Y of the guide rail 2. The slider 3 may have a length less than the length L1 (see FIG. 4) of the guide rail 2. For example, the slider 3 may be disposed on the guide rail 2 so as to be slidable. For another example, the slider 3 may be disposed on the surface of the guide rail 2 facing the parking area so as to be slidable.

The slider 3 may move by a person or move by a second driving source 6 (see FIG. 4) separated from the first driving source 4. The second driving source 6 may be a linear movement mechanism for moving the slider 3 in the longitudinal direction Y of the guide rail 2. An example of the second driving source 6 may include a linear motor and a linear guide installed on the guide rail 2 or the slider 3 to linearly move the slider 3. Another example of the second driving source 6 may include a motor installed on the guide rail 2 or the slider 3 to rotate a rotation shaft and at least one power transmission member connected to the rotation shaft and the slider 3 of the motor. The power transmission member of the second driving source 6 may be constituted by a plurality of gears such as a pinion connected to the rotation shaft of the motor and a rack with which the pinion is engaged. As long as the second driving source 6 is configured to move the slider 3 in a straight line, the second driving source 6 is not limited to the above-described kinds.

The first driving source 4 may be controlled in a plurality of modes. The plurality of modes may be divided by an angle or arrangement direction of the rotation arm 5 with respect to the guide rail 2.

The first driving source 4 may include a motor, an actuator, or the like for rotating the rotation arm 5. The first driving source 4 may include a motor connected to the rotation arm 5. For example, the first driving source 4 may include a motor having rotational force and a gear such as at least two reduction gears that transmits the rotational force of the rotation shaft to the rotation arm 5 between the rotation shaft and the rotation arm 5 of the motor.

The plurality of modes may include a first mode and a second mode.

As illustrated in FIG. 6, the first mode may be a mode in which the rotation arm 5 is lengthily disposed in the first direction in which the guide rail 2 has a relatively long length in the longitudinal direction Y of the guide rail 2.

The first driving source 4 may rotate the rotation arm 5 in the first mode above the guide rail 2 as illustrated in FIG. 6. In this case, the vehicle service robot 100a may be disposed at the service providing position P1 on the guide rail 2.

The second mode may be a mode in which the rotation arm 5 is lengthily disposed in the second direction X crossing the longitudinal direction Y of the guide rail 2.

In the second mode, the first driving source 4 may rotate the rotation arm 5 so that a portion of the rotation arm 5 is disposed on the guide rail 2 as illustrated in FIG. 8, and a remaining portion 5B of the rotation arm 5 does not overlap the guide rail 2 in the vertical direction Z. In this case, the vehicle service robot 100a may be disposed at the service providing position P2 rather than on the guide rail 2.

That is, the first driving source 4 may move the vehicle service robot 100a to the first service providing position P1 on the guide rail 2 or to the second service providing position P2 around the guide rail 2.

The rotation arm 5 includes a first driving source connection part 51 rotated by the first driving source 4 and a service robot mounting part 52 disposed at a side opposite to the first driving source connection part 51 in the longitudinal direction of the rotation arm 5.

The first driving source connection part 51 may be disposed on the slider 3, and the service robot mounting part 52 may be disposed on the slider 3 or may not be disposed on the slider 3 according to the rotational angle of the rotation arm 5 but disposed close to the parking areas A1, A2, A3, and A4.

The robotic system may correspond to an area as long as the length L1 of the guide rail 2, the length L2 of the rotation arm 5 and the maximum extension length of the service providing robot 100a.

The length L2 of the rotation arm 5 may be a longitudinal length of the rotation arm 5. The length L2 of the rotation arm 5 may be a factor that determines a reaching distance by which vehicle service robot 100a is away from the guide rail 2.

The more the length L2 of the rotation arm 5 increases, the more a distance at which the vehicle service robot 100a maximally reaches the guide rail 2 (hereinafter, a maximum reaching distance) may increase, and the more the length L2 of the rotation arm decreases, the more a distance at which the vehicle service robot 100a maximally reaches the guide rail 2 may decreases.

The length L2 of the rotation arm 5 may be less than the length L1 of the guide rail 2. A minimum length of the rotation arm 5 may be greater than the length L3 of the guide rail 2 in the front and rear direction X.

The length L2 of the rotation arm 5 may be properly determined in consideration of a weight of the vehicle service robot 100a, an amount of deflection of the service robot mounting part 52 of the rotation arm 5, and an interference with the vehicle 20 when the rotation arm 5 rotates.

The length L2 of the rotation arm 5 may have an appropriate length L2 at which the rotation arm 5 rotates between a pair of vehicles adjacent to each other even when the vehicle is parked in each of a pair of parking areas A2 and A3 adjacent to each other. As illustrated in FIG. 9, the length L2 of the rotation arm 5 may be less than the shortest straight distance L4 between a wheel stopper 12 and the guide rail 2 installed in the parking areas A1, A2, A3, and A4.

When a plurality of wheel stoppers 12 are installed in the parking areas A1, A2, A3 and A4, the length L2 of the rotation arm 5 is less than the shortest straight distance L4 between the wheel stopper 12, which is closest to the guide rail 2, of the plurality of wheel stoppers 21 and an the guide rail 2.

The robotic system may further include a charger 7 for charging the vehicle. The charger 7 may be connected to the vehicle service robot 100a through CAN communication or RS communication.

The charger 7 may be controlled by a charging station system CCS. The charging station system CCS may control charging of the vehicle 20 by the charger 7, management of the charger 7, and a payment system.

The charger 7 may be installed to be fixed around the parking areas A1, A2, A3, and A4. The charger 7 may include a plug 71 connected to the charging port of the vehicle. The charger 7 may further include a charger body 72. The charger body 72 and the plug 71 may be connected to a charging cable 73.

The plug 71 may be mounted on a plug holder installed in the charger body 72 while the vehicle is not charged. Also, for charging the vehicle, the plug 71 may move to a position of the charging port of the vehicle, which is a target to be charged, by the slider 3, the rotation arm 5, and the vehicle service robot 100a.

The charger body 72 may be provided with a payment module and a payment system capable of paying service costs. The payment via credit card, recharge card, mobile, cash, NFC, etc. may be performed through the payment module. The payment module may be configured as a touch screen or a card reader, etc. that is capable of being touched by a payer.

When the charger 7 completes the payment of the service cost through the payment module, the payment system transmits a payment completion signal to a robot control system RSR or a control system CS, which will be described later, of the vehicle service robot 100a, and thus, the robot system may prepare the charging of the vehicle.

The first driving source 4, the second driving source 6, and the vehicle service robot 100a may constitute the robot control system RSR.

The robot control system RSR (or robot system) may transfer the plug 71 around the charging port of the vehicle to connect the plug 71 to the charging port. When the charging is completed, the plug 71 is disconnected from the charging port to move to the charger 7.

The robot control system RSR (or robot system) may control the first driving source 4, the second driving source 6, and the vehicle service robot 100A. The robot control system RSR may include a controller capable of controlling the first driving source 4, the second driving source 6, and the vehicle service robot 100a. The controller may control the first driving source 4 and/or the second driving source 6 so that the vehicle service robot 100a moves around the charging port position. The controller may be installed in at least one of the vehicle service robot 100a, the charger 7, and the server 500.

The vehicle service robot 100a may be controlled in a plurality of modes, and the plurality of modes may include a connection mode and a release mode.

The connection mode may be a mode in which the vehicle service robot 100a connects the plug 71 of the charger 7 to the charging port of the vehicle 20.

The release mode may be a mode in which the vehicle service robot 100a separates the plug 71 from the charging port.

The controller may control the first driving source 4 and/or the second driving source 6 so that the vehicle service robot 100a moves around the charging port of the vehicle 20 when the vehicle 20 is in a chargeable state and then control the vehicle service robot 100a in the connected mode.

The robot system may include an indicator 8 or a display mechanism for displaying a chargeable area among the plurality of parking areas A1, A2, A3, and A4. The indicator 8 is preferably disposed at a height H5, which provides optimal information to the driver of the vehicle moving toward the parking areas A1, A2, A3 and A4.

The indicator 8 may be provided as a display and may include indicators such as arrows. Also, the indicator 8 may be provided as beam irradiator which irradiates a laser beam or the like to front of the vehicle 20.

The indicator 8 may be provided by a combination of the display 81 and the indicator 82. For example, when the vehicle enters, the display 81 displays a license number of the vehicle 20, positions or numbers of the parking areas A1, A2, A3, and A4, a position or number of the vehicle service robot 100a, and a position or number of the vehicle service charger 7. The indicator 8 may guide the parking of the vehicle 20 so that the vehicle 20 travels to the parking area that is optimally provided with the service.

The robotic system may include a plurality of vehicle service robots 100a and a plurality of chargers 7, and when the vehicle 20 is parked in the parking area selected by the driver or in the parking area guided by the robotic system, the indicator 8 may guide the stop of the vehicle 20.

The robotic system may further include a speaker 9 capable of generating announcements or warning sounds to guide the use of the vehicle service facility 1. The speaker 9 may perform guide broadcasting for limiting riding and getting off of the driver or the like until the plug 71 is connected to the charging port of the vehicle 20. The speaker 9 may perform the guide broadcasting to guide the driver when the vehicle 20 is unsuitable for receiving the service by the vehicle service robot 100a.

The robotic system may further include at least one sensor. The sensor may sense the vehicle 20. The sensor may sense not only the vehicle 20 but also an area around the vehicle or the driver.

The sensor may include a vision sensor 91. The vision sensor 91 may recognize a vehicle license plate or the like when the vehicle 20 enters.

When the license plate is recognized by the vision sensor 91, the robot system may move the vehicle service robot 100*a* near to the position of the charging port of the vehicle according to the information of the vehicle sensed by the vision sensor 91, that is, the license plate 91.

The information of the vehicle license plate sensed by the vision sensor 91 may be transmitted to the server 500, and the robotic system, for example, the server 500 may inquire a kind of vehicle of which the vehicle license plate is sensed, and a position of the charging port according to the information of the vehicle sensed by the vision sensor 91. The server 500 may transmit the charging port position information of the vehicle to the robot control system RSR to be described later. The server 500 may constitute the control system CS.

The server 500 may be provided as the AI server illustrated in FIGS. 2 and 3 and may be provided as a general server storing various data for controlling the robot system without using the artificial neural network.

The server 500 is preferably provided as the AI server so that information about new vehicles, license plates, and the like are automatically updated, but the server 500 is not limited to the AI server.

The robot system may move the vehicle service robot 100*a* around the charging port position according to the information of the license plate. Also, for this, the robot system may drive at least one of the first driving source 4 or the second driving source 6.

The vision sensor 91 may sense a hazard around the vehicle 20, for example, around the vehicle service robot 100*a* while the vehicle 20 is being charged. The vision sensor 91 may sense whether the position of the vehicle 20 or the surrounding object approaches the vehicle 20, the vehicle service robot 100*a*, or the charger 7, whether the door of the vehicle 20 is opened, whether the driver's is ridden or getting off, and whether the vehicle 20 is started.

The vision sensor 91 may be preferably installed at a position capable of reliably sensing the vehicle license plate of the vehicle that enters in the parking areas A1, A2, A3, and A4. Also, the vision sensor 91 may preferably installed at a position capable of sensing all of the vehicle 20, which is in the parking areas A1, A2, A3, and A4, the vehicle service robot 100*a*, and the charger 7.

The vision sensor 91 is capable of sensing information on approximately above the parking area A1, A2, A3, A4.

The vision sensor 91 may constitute a global vision system GV capable of sensing information of the vehicle on the vehicle 20.

The global vision system GV may recognize the license plate of the vehicle when the vehicle 20 is in the vehicle 20 and sense a risk factor while the vehicle is changed.

The vision sensor 91 may be constituted by a combination of a plurality of camera sensors, and the plurality of camera sensors may be installed to sense different areas of the vehicle service facility 1. For example, one of the plurality of camera sensors 91A may be installed at a position capable of reliably sensing the vehicle license plate when the vehicle 20 enters. The other camera sensor 91B of the plurality of camera sensors may be installed at a position capable of sensing the vehicle 20, the parking areas A1, A2, A3, A4, the vehicle service robot 100*a*, and the charger 7 around the parking area.

The sensor may include an ultrasonic sensor 92. The ultrasonic sensor 92 may be a sensor capable of sensing the approach of an object and a distance from the object and may be installed to be disposed around the parking areas A1, A2, A3, and A4. The ultrasonic sensor 92 may be installed on the guide rail 2, the slider 3, or the like. The ultrasonic sensor 92 may sense whether the vehicle 20 is close to the parking areas A1, A2, A3, and A4 and whether the vehicle 20 is out of the parking area.

The vision sensor 91 and the ultrasonic sensor 92 may sense various factors (e.g., risk factors) for determining whether a service starts before providing the service by the vehicle service robot 100*a*.

The sensor may include a vision camera 93 capable of sensing the charging port of the vehicle 20. The vision camera 93 may be mounted to the vehicle service robot 100*a*. When the vehicle service robot 100*a* moves near to coordinates (X, Y, Z) of the charging port, the vision camera 93 may sense a port cover or a kind of the port cover, and the vehicle service robot 100*a* may open the port cover to be opened. When the port cover is opened by the vehicle service robot 100*a*, the vision camera 93 may sense the charging port that is not covered by the port cover, and the vehicle service robot 100*a* may accurately recognize the position of the charging table.

The vision camera 93 may constitute the robot vision system RSC capable of recognizing the position of the charging port of the vehicle 20. The robot vision system RCS may be installed in the vehicle service robot 100*a* to sense the charging port of the vehicle 20.

The robotic system may further include a sensor control system SS. The sensor control system SS may be a system for controlling sensors related to safety. The vehicle service facility 1 may include an area sensor 94 and an ultrasonic sensor 92, which detect obstacles around the parking zone.

The control system CS may query database of the vehicle 20 and control the speaker 9 to conduct the guide broadcast to guide the provision of the service to the vehicle 20.

As illustrated in FIG. 11, the control system CS communicate with a sensor control system SS, a global vision system GV, a charging station system CCS, a robot control system RSR, and a robot vision system RSC and control each of the sensor control system SS, the global vision system GV, the charging station system CCS, the robot control system RSR, and the robot vision system RSC. In this case, the robot system may be a centralized control system, the control system CS may manage data of each system SS, GV, CCS, RSR, and RSC, and when a data request signal is transmitted from each system, the robot system may transmit data corresponding to the request signal to the system to which the request signal is transmitted.

As described above, when the control system CS is connected to communicate with each of the sensor control system SS, the global vision system GV, the charging station system CCS, the robot control system RSR, the robot vision system RSC, the data between each system may be easily managed, and introduction of additional systems in addition to the system or removal of a portion of the systems may be easy.

Figure 12:
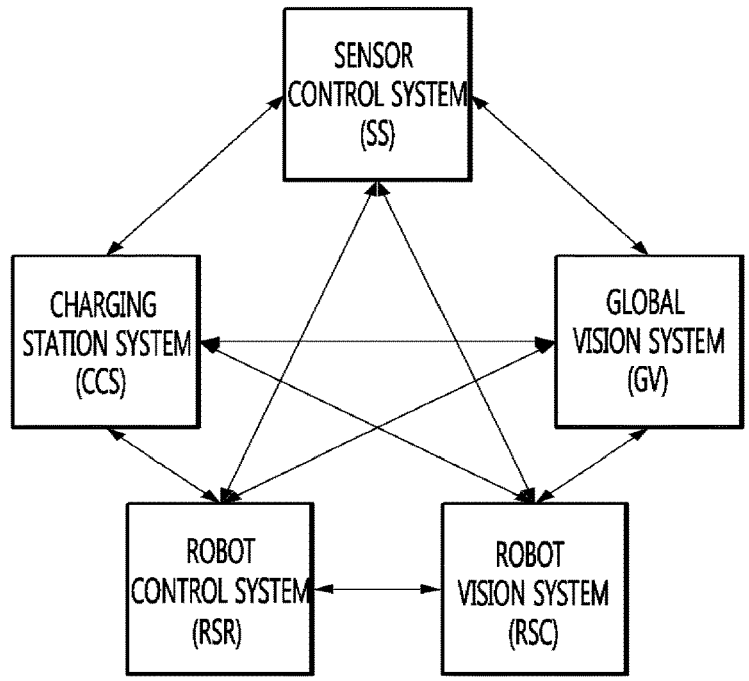
FIG. 12 is a control block diagram illustrating another example of the robot system according to an embodiment.

FIG. 12 is a control block diagram illustrating another example of the robot system according to an embodiment.

In the robot system illustrated in FIG. 12, each of the sensor control system SS, the global vision system GV, the charging station system CCS, the robot control system RSR may be connected to communicate with another system without the separate control system CS illustrated in FIG. 11. In this case, the robotic system may be a distributed control system. In this case, each system may be provided independently, and thus, debugging of each system may be convenient.

Figure 13:
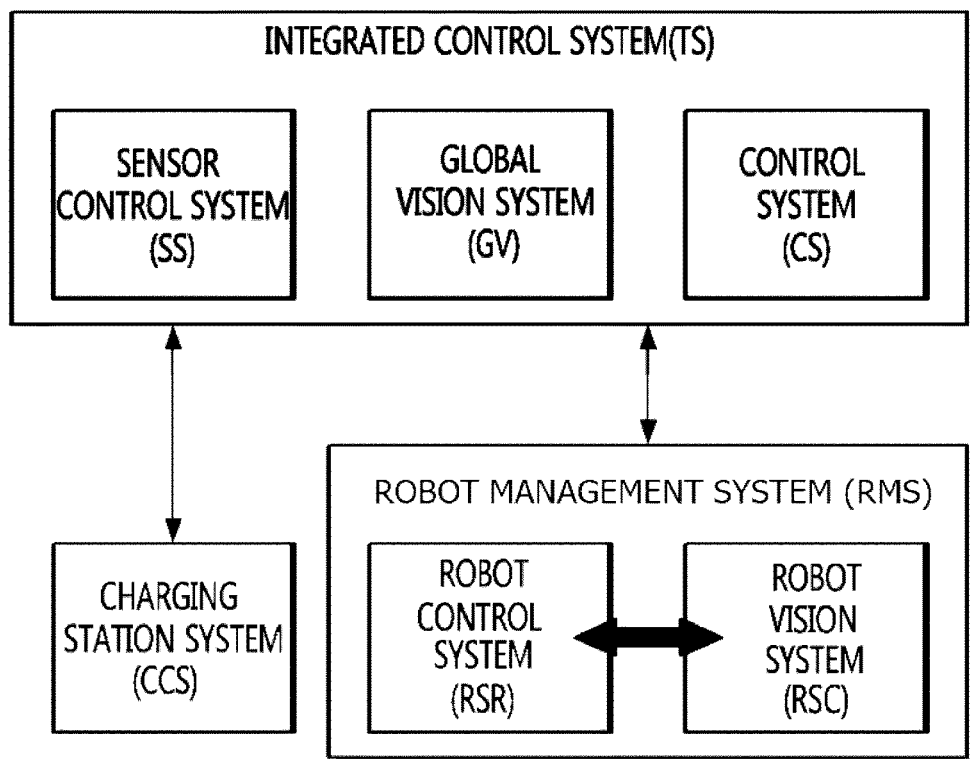
FIG. 13 is a control block diagram illustrating further another example of the robot system according to an embodiment.

FIG. 13 is a control block diagram illustrating further another example of the robot system according to an embodiment.

The robot system illustrated in FIG. 13 may include a robot management system RMS, a charging station system CCS, and an integrated control system TS.

The robot management system RSM may include a robot control system RSR controlling the first driving source 4, the second driving source 6, and the vehicle service robot 100a and a robot vision system RSC installed in the vehicle service robot 100a to sense the charging port of the vehicle 20.

The integrated control system TS may include a control system CS, a sensor control system SS, and a global vision system GV recognizing the license plate of the vehicle 20 when the vehicle 20 enters and sensing the hazard during the charging of the vehicle 20.

The integrated control system TS may communicate with the robotic management system RM and the charging station system CCS.

The robot system illustrated in FIG. 13 may combine the related systems with each other to constitute a large system to communicate with the large system and may minimize data communication when compared to the centralized control system illustrated in FIG. 11.

Figure 14:
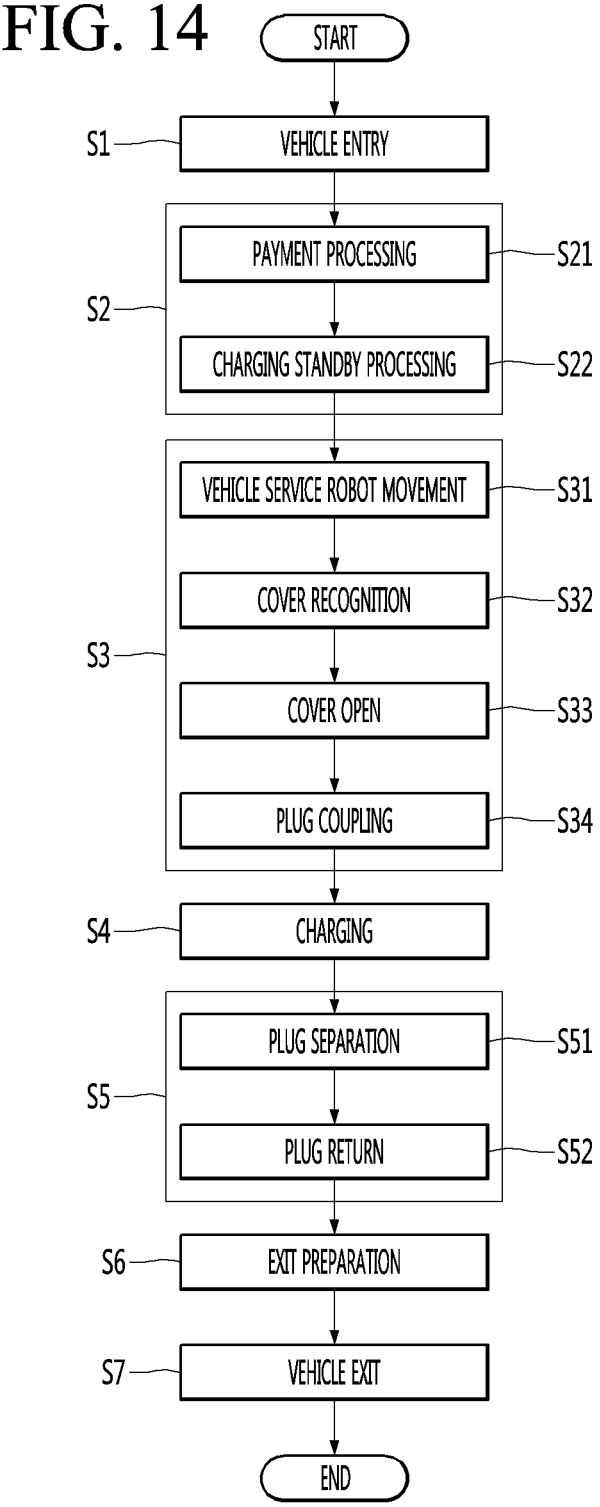
FIG. 14 is a flowchart illustrating a method for controlling a robot system according to an embodiment.

FIG. 14 is a flowchart illustrating a method for controlling a robot system according to an embodiment.

As illustrated in FIG. 14, a method for controlling a robot system may include: entry processing (S1) of processing entering of a vehicle 20 when the vehicle enters, charging processing (S2) of preparing charging of the vehicle 20; connection processing (S3) of allowing a vehicle service robot 100a to connect a plug 71 of a charger 7 to a charging port of the vehicle 20; and charging processing (S4) of charging the vehicle 20.

The entry processing (S1) may recognize a license plate of the vehicle 20, which enters the vehicle service facility 1, through a vision sensor 91, and the robot system may confirm a position of the charging portion of the vehicle 20 that enters the vehicle service facility 1. Information sensed by the vision sensor 91 may be transmitted to a server 500, and the server 500 may inquire a manufacturer, a model, and a model name according to the license plate sensed by the vision sensor 91, and also inquire a position of the charging port of the corresponding vehicle. That is, the server 500 may transmit charging port position information of the vehicle according to the information of the vehicle sensed by the sensor, in particular, the vision sensor 91. The server 500 may transmit a signal according to the position information of the inquired charging port to a robot control system RSR, a robot vision system RSC, a charging station system CCS, an indicator 8, a speaker 9, and the like.

The server 500 may determine one vehicle service robot 100a of the plurality of vehicle service robots 100a, which services a vehicle (hereinafter, referred to as a service target vehicle), of which a license plate is sensed, by preset program or an artificial neural network.

When the vehicle service robot 100a that services the serviced vehicle is determined, the parking area to be parked and the charger 7 to be serviced by the determined vehicle service robot 100a may be determined.

In the entry processing (S1), the vehicle may be guided to the parking area corresponding to the determined charging service robot 100a and the charger 7.

The server 500 may transmit a signal of the parking area in which the vehicle is parked to at least one of the indicator 8 and the speaker 9.

The indicator 8 may display an arrow, a charger number, and the like for guiding a direction in which the charger 7 is disposed. The speaker 9 may guide the direction in which the charger 7 is disposed.

In the entry processing (S1), the robot system may guide a plurality of parking areas and a plurality of chargers 7 without guiding one parking area and one charger 7. A driver that drives the service target vehicle 20 may select any one of the plurality of guided parking zones/chargers 7 and park the vehicle in the selected parking area.

When the service target vehicle 20 is completely parked in the parking area, the robot system may determine whether the service target vehicle 20 is normally parked in the parking area by the vision sensor 91, the ultrasonic sensor 92, the vision camera 93, or the like.

The vision sensor 91 or the vision camera 93 may sense a port cover of the service target vehicle 20. If that the port cover is disposed in the chargeable area is not sensed by the vision sensor 91 or the vision camera 93, the robot system may induces the vehicle so that the port cover is disposed in the chargeable area through the indicator 8 and the speaker 9 or the like.

Here, the chargeable area may be an area set in the parking area and may be defined as an area in which the vehicle service robot 100a moving by the rotary arm 5 connects the plug 71 to the charging port.

If the port cover is disposed within the chargeable area by the vision sensor 91 or the vision camera 93, the robot system may service the service target vehicle 20. Thus, the service target vehicle 20 may be stopped through the indicator 8 and the speaker.

As described above, when the stop of the service target vehicle 20 is completed, the entry process (S1) may be completed.

The charge preparation processing (S2) may include payment processing (S21).

In the payment processing (S21), a payer such as a driver or a passenger (hereinafter, referred to as a customer) may approach the charger 7 to pay a service cost through the payment module and the payment system. The payer may pay the cost through a credit card, a charge card, mobile, cash, NFC, and the like, and when the payment of the service cost is completed, the payment system may transmit a signal of payment completion.

During the payment processing (S21), the payment module may display a type of charge (rapid charging, normal charging, and the like), charging time, charging cancellation, etc., and the payer may pay after selecting the charging type and charging time.

The payer may input the charge cancellation while the payment processing for the payment module is in progress and then depart the service target vehicle 20. In this case, the robot system may initiate the process.

In the charging preparation processing (S2), when the payment is completed by the above payment processing (S21), the charging standby processing (S22) may be performed.

The charging standby processing (S22) may be a process of confirming whether it is suitable for starting the charging and whether it is safe before the charging process (S3).

The payer such as the service target vehicle 20 or the driver among the service target vehicle 20 and the vehicle service robot 100a may open the port cover, and the robot system may guide the opening of the port cover.

During the charging standby processing (S22), the opening of the port cover may be requested through a display or a guide speech, and the opening of the port cover may be sensed through the vision sensor 91 or the vision camera 93.

In the charging standby processing (S22), the robot system may check whether the vision sensor 91 re-senses the license plate of the service target vehicle 20 and whether the license plate is identical to the license plate sensed in the entry processing (S1). In this case, the robot system may check whether the vehicle that is guided the parking to the specific parking area matches the vehicle that has completed the service fee payment.

In the charging standby processing (S22), the robot system may sense whether the vehicle service robot 100a is safe by using the vision sensor 91, the ultrasonic sensor 92, and the vision camera 93.

In the charging standby processing (S22), at least one of the vision sensor 91 and the ultrasonic sensor 92 may sense whether the service target vehicle 20 is out of the parking target area.

In the charging standby processing (S22), the vision sensor 91 may sense the starting of the vehicle 20, the opening of the door of the vehicle 20, and the getting off of the customer.

In the charging standby processing (S22), the vision sensor 91 may sense whether a nearby object approaches the service target vehicle 20, the vehicle service robot 100a, or the charger 7.

In the charging standby processing (S22), the robot system may generate a guide broadcast to limit the riding or getting off of the customer. The speaker 9 may transmit information such as whether the charging is to be started or the charging start time to the customer before the charging starts.

As described above, in the charging standby processing (S22), when the vehicle 20 is outside the parking area, the vehicle 20 is not started off, the door of the vehicle 20 is opened, the customer gets off, or the ultrasonic sensor 92 or the vision sensor 91 approaches the vehicle, the vehicle service robot 100a, or the charger 7, the following connection processing (S3) may not start or may be in standby. That is, the operation of the vehicle service robot 100a and the operation of the charger 7 may be stopped.

In the charging standby processing (S22), when the vehicle 20 is in the parking area, the vehicle 20 is started off, the door of the vehicle 20 is closed, and the surrounding object does not approach the vehicle, the vehicle service robot 100a, or the charger 7 without the customer does not get off, the robot system does not start the connection processing (S3).

The connection processing (S3) may be a process in which the vehicle service robot 100a moves the vehicle service robot 100a to a position (hereinafter, optimal service position) at which the vehicle service robot 100a optimally executes the service such as the charging service, and then the vehicle service robot 100a moving to the vehicle service robot 100a couples the plug 71 of the charger 7 to the charging port of the service target vehicle 20.

The connecting processing (S3) may include moving processing (S31) of moving the vehicle service robot 100a to the optimal service position.

In the state in which the service robot 100a holds the plug 71 of the charger 7, the robot system may drive the second driving source 6 to move the slider 3 and then drive the first drive 4 to rotate the rotation arm 5. Then, when the slider 3 moves, and the rotation arm 5 rotates, the service target vehicle 20 may move to a position (i.e., the optimal service position) that is close to the charging port of the service target vehicle, which is transmitted from the server 500.

When the vehicle service robot 100a moves to the optimum service position by the movement of the slider 3 and the rotation of the rotary arm 5, the vehicle service robot 1 may couple the plug 71 to the charging port.

The connecting processing (S3) includes a process (S32) in which the vision camera 93 senses the port cover position (hereinafter, referred to as cover recognition processing (S32)), a process (S33) of approaching around the port cover sensed by the vision camera 93 to sense a kind of cover, thereby opening the cover of the vehicle service robot 100a (hereinafter, referred to as cover opening processing (S33)), and a process (S34) of allowing the vehicle service robot 100a to couple the plug 71 of the charger 7 to the charging port (hereinafter, referred to as plug coupling processing (S34)).

The cover recognition processing (S32) may be a process of sensing the port cover of the service target vehicle 20 to recognize the charging port of the service target vehicle 20.

In the cover recognition processing (S32), the vision camera 93 may sense the port cover at an optimal service position, and a signal according to the position information of the sensed port cover may be transmitted to the controller.

In the cover opening processing (S33), the vehicle service robot 100a may close the vision camera 93 to the port cover, and the vision camera 93 may sense the type of the port cover.

The vehicle service robot 100a may be equipped with a tool for opening the port cover, and the vehicle service robot 100a may operate so that the tool holds and rotates or slides the port cover.

When the port cover is opened by the vehicle service robot 100a, the vision camera 93 of the vehicle service robot 100a may sense the charging port, and the vehicle service robot 100a may confirm whether the charging port of the service target vehicle matches the charging port transmitted from the server 500 and recognize the position of the charging port.

In the plug coupling processing (S34), the vehicle service robot 100a may control the position, force, and rigidity of the plug 71.

The position control of the plug 71 may be control for positioning the plug 71 so that the plug 71 moves to a position facing the charging port. In the controlling of the position of the plug 71, the vehicle service robot 100a approaches the plug 71 from the optimum service position to the approach position and then moves from the approach position to a final alignment position.

The controlling of the force and rigidity of the plug 71 may be control of moving the plug 71 in a direction in which the plug 71 disposed at the final alignment position is coupled to the charging port and coupling the plug 71 to the charging port at external force N within a set range and rigidity (N/m) within a set range.

When the plug 71 is normally connected to the charging port, the vehicle service robot 100a may generate a charge connection signal, and the operation of the vehicle service robot 100a may be stopped. When the charging connection signal is generated, the charging processing (S4) may be performed.

In the charging processing (S4), the charger 7 may charge the serviced vehicle through a charging cable 73 and the plug 71, and when the charging is completed, the charger 7 may generate a charging completion signal. The charging completion signal may be transmitted to the vehicle service robot 100*a* through the control system CC or directly transmitted from the charger 7 to the vehicle service robot 100*a*.

When the charge completion signal is received, the vehicle service robot 100*a* may perform a separation processing (S5) to be described later.

The method for controlling the robot system may further include the separation step (S5) of separating the plug 71 from the charging port of the vehicle 20.

When the charging completion signal is received by the vehicle service robot 100*a* during the separation processing (S5), the vehicle service robot 100*a* may separate the plug 71 from the charging port (S51, hereinafter, referred to as plug separation processing (S51)).

In the plug separation processing (S51), the vehicle service robot 100*a* may control the position, the force, and the rigidity of the plug 71.

In the separating processing (S5), the vehicle service robot 100*a* may include a process of returning the plug 71 to the charger 7 (S52, hereinafter, referred to as plug return processing (S52)).

In the plug return processing (S52), the vehicle service robot 100*a* may be a process of moving the plug 71 separated from the charging port to a supporter of the charger body 72, and the first driving source 4 and the second driving source 6 may be driven to move the vehicle service robot 100*a* to a setting position around the charger 7. Here, the setting position may be a position at which the plug 71 is connected to the charger body 72 by the operation of the vehicle service robot 100*a* and may be a preset position around the charger 7.

As described above, in the separation processing (S5), the robot system may operate so that the vehicle service robot 100*a* closes the port cover, and the service target vehicle 20 or the customer closes the port cover.

The robotic system may guide the driver or the like through the indicator 8 or speaker 9 to close the port cover.

The method for controlling the robot system further includes: exit preparation processing (S6) for preparing exiting of the vehicle, which is performed after the separation processing (S5); and exit processing (S7) for processing the exiting of the vehicle 20.

The exit preparation processing of the exiting of the vehicle may include: allowing the vision sensor to sense a closed state of the port cover that covers the charging port; allowing the vision sensor to inform the opened state of the port cover when the port cover is in the opened state; and allowing the vision sensor to confirm surroundings or a vehicle state.

The exit processing (S7) may reset the vehicle service robot 100*a* and notify the customer of the completion of the charging.

Figure 15:
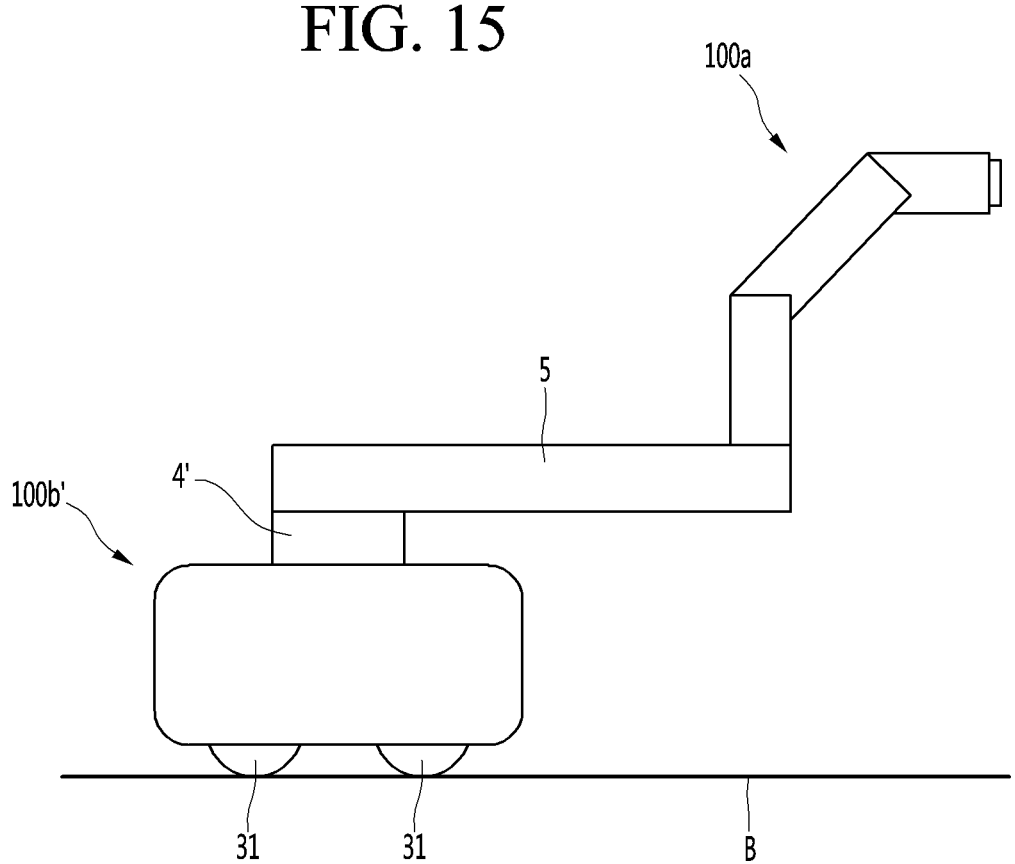
FIG. 15 is a view illustrating a modified example of the vehicle service robot according to an embodiment.

FIG. 15 is a view illustrating a modified example of the vehicle service robot according to an embodiment.

The robot system illustrated in FIG. 15 includes a transfer robot 100*b'* having a driving wheel 31; a driving source 4' installed in the transfer robot 100*b'*; a rotation arm 5 rotating by the driving source 4'; and a vehicle service robot 100*a* installed in the rotation arm 5, which moves by the rotation arm 5.

An example of the transfer robot 100*b'* illustrated in FIG. 15 may be an autonomous vehicle capable of traveling by itself, and the transfer robot 100*b'* may travel unmannedly around the vehicle 20 that is a service target. The driving source 4' may rotate the rotary arm 5 when the transfer robot 100*b'* is driven around the vehicle 20 or when the transfer robot 100' is completed driving around the vehicle. The service robot 100*a* may move to an optimal service position around the vehicle 20.

In the robot system of this embodiment, since the transfer robot 100*b'* includes the driving wheel 31, the structure may be complicated. However, as illustrated in the drawings, when the rotation arm 5 rotates with respect to the slider 3, a movable area of the vehicle service robot 100*a* may be larger.

According to an embodiment, the vehicle service robot may move to a position at which the vehicle is serviced by the slider and the rotation arm, to maximize the reach distance of the vehicle service robot with the simple structure.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A method for controlling a robot system, which comprises: a driving source; a rotation arm rotating by the driving source; and a vehicle service robot installed on the rotation arm, the method comprising:
   entry processing of a vehicle when the vehicle enters;
   preparing charging of the vehicle;
   allowing the vehicle service robot to connect a plug to a charging port of the vehicle after the rotation arm rotates by the driving source so that the vehicle service robot moves to a position adjacent to the charging port of the vehicle in a state of holding a plug of a charger; and
   charging the vehicle,
   wherein the entry processing of the vehicle comprises:
   allowing a vision sensor to sense a license plate of the vehicle;
   confirming a position of the charging port of the vehicle according to the license plate;
   determining a charging service robot for servicing the vehicle of which the license plate is sensed among a plurality of charging service robots; and
   guiding the vehicle to a parking area corresponding to the determined charging service robot.

2. The method according to claim 1, wherein the preparing charging of the vehicle comprises:
   allowing a customer to pay a service cost; and
   allowing the vehicle to be standby for charging after a payment of the service cost.

3. The method according to claim 2, wherein the allowing the vehicle to be standby comprises:
   allowing the vision sensor to re-sense the license plate of the vehicle; and
   confirming whether the license plate recognized in the entry processing of the vehicle is the same.

4. The method according to claim 2, wherein the allowing the vehicle to be standby comprises:
   allowing at least one of the vision sensor or an ultrasonic sensor to sense whether the vehicle gets out of a parking area, allowing the vision sensor to sense start-off of the vehicle, door opening of the vehicle, and getting off of the customer;

allowing the vision sensor to sense whether a nearby object to approaches the vehicle, the vehicle service robot, or the charger; or generating an announcement for limiting riding or getting off of the customer.

5. The method according to claim 1, wherein the allowing the vehicle service robot to connect a plug to a charging port comprises:

allowing a vision camera to recognize a position of a port cover;

allowing the vision camera to approach surroundings of the recognized position and sense a type of port cover, and allowing the vehicle service robot to open the port cover; and allowing the vehicle service robot to connect the plug to the charging port, wherein, when the plug is connected to the charging port, a position, force, and rigidity of the plug are controlled.

6. The method according to claim 1, further comprising separating the plug from the charging port of the vehicle, wherein the separating of the plug comprises:

allowing the vehicle service robot to separate the plug from the charging port when the charger receives a charging completion signal from the robot; and allowing the vehicle service robot to move so that the plug returns to the charger.

7. The method according to claim 6, further comprising:

preparing exiting of the vehicle; and processing the exiting of the vehicle, wherein the preparing of the exiting of the vehicle comprises:

allowing a vision sensor to sense a closed state of a port cover that covers the charging port;

allowing the vision sensor to inform an opened state of the port cover when the port cover is in the opened state; and allowing the vision sensor to sense surroundings or a vehicle state, wherein preparing exiting of the vehicle comprises:

resetting the vehicle service robot; and informing charging completion to a customer.

* * * * *